(12) United States Patent
Auld et al.

(10) Patent No.: US 9,371,466 B2
(45) Date of Patent: Jun. 21, 2016

(54) METHOD OF MAKING POLYMER ENCAPSULATED TITANIUM DIOXIDE PARTICLES

(71) Applicant: Rohm and Haas Company, Philadelphia, PA (US)

(72) Inventors: Kathleen A. Auld, Collegeville, PA (US); James Keith Bardman, Green Lane, PA (US); Michele Heffner, Chalfont, PA (US); David G. Kelly, Ambler, PA (US); Michael Rhodes, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/483,796

(22) Filed: Sep. 11, 2014

(65) Prior Publication Data

US 2015/0079397 A1 Mar. 19, 2015

Related U.S. Application Data

(60) Provisional application No. 61/877,512, filed on Sep. 13, 2013.

(51) Int. Cl.
| | | |
|---|---|---|
| *C08K 3/22* | (2006.01) | |
| *B05D 7/00* | (2006.01) | |
| *C09D 131/04* | (2006.01) | |
| *C09C 1/36* | (2006.01) | |
| *C09D 5/02* | (2006.01) | |
| *C09D 7/12* | (2006.01) | |

(52) U.S. Cl.
CPC ............ *C09D 131/04* (2013.01); *C08K 3/22* (2013.01); *C09C 1/3676* (2013.01); *C09D 5/028* (2013.01); *C09D 7/1225* (2013.01); *C08K 2003/2241* (2013.01); *Y10T 428/2998* (2015.01)

(58) Field of Classification Search
USPC .................................................. 428/403, 407
See application file for complete search history.

(56) References Cited

U.S. PATENT DOCUMENTS

| | | | |
|---|---|---|---|
| 8,283,404 | B2 | 10/2012 | Allen et al. |
| 2002/0096088 | A1* | 7/2002 | Bardman et al. ............. 106/436 |
| 2006/0009546 | A1 | 1/2006 | Brown |
| 2006/0223911 | A1* | 10/2006 | Bardman et al. ............. 523/200 |
| 2010/0298483 | A1* | 11/2010 | Allen et al. .................. 524/497 |
| 2014/0011943 | A1* | 1/2014 | Bardman et al. ............. 524/521 |

FOREIGN PATENT DOCUMENTS

WO 2012/116025 A1 8/2012

\* cited by examiner

*Primary Examiner* — Holly Le
(74) *Attorney, Agent, or Firm* — Kenneth Crimaldi

(57) ABSTRACT

A process for encapsulating $TiO_2$ particles by polymerizing sodium styrene sulfonate with a redox initiator system; then polymerizing a first monomer mixture comprising at least 60 wt % acrylic monomers; then polymerizing a second monomer mixture comprising at least 40 wt % vinyl ester monomers.

6 Claims, No Drawings

METHOD OF MAKING POLYMER ENCAPSULATED TITANIUM DIOXIDE PARTICLES

BACKGROUND OF THE INVENTION

The present invention relates to polymer encapsulated $TiO_2$ particles and a process for preparing them. The particles are useful for plastics and coatings formulations.

Opacifying pigments such as $TiO_2$ provide opacity (hiding) for coatings and for plastics to conceal the undersurface. It is believed that the efficiency of the pigment is related to the spacing of the pigment particles in the coating or plastic. Improvements in spacing can be achieved, for example, by at least partially encapsulating the pigment, as disclosed in WO2012/116025. It would be desirable to find improved opacifying pigment compositions and more efficient ways of making them.

SUMMARY OF THE INVENTION

The present invention is directed to a process comprising steps of:
(a) contacting a mixture of i) an aqueous dispersion of $TiO_2$ particles and a sulfur-acid containing polymer; ii) an anionic surfactant; and iii) an aqueous solution of sodium styrene sulfonate with a redox initiator system; then
(b) adding to the mixture of step (a) an aqueous dispersion of a first monomer mixture comprising monomers selected from the group consisting of acrylic monomers, ethylene monomers, styrene monomers, vinyl ester monomers, and combinations thereof; wherein said first monomer mixture comprises at least 60 wt % acrylic monomers, based on total weight of monomers in the first monomer mixture;
(c) polymerizing the first monomer mixture to form an aqueous dispersion of a first polymer that at least partially encapsulates the $TiO_2$ particles;
(d) adding to the aqueous dispersion of step (c) an aqueous dispersion of a second monomer mixture comprising monomers selected from the group consisting of acrylic monomers, ethylene monomers, styrene monomers, vinyl ester monomers, and combinations thereof; wherein said second monomer mixture comprises at least 50 wt % vinyl ester monomers, based on total weight of monomers in the second monomer mixture; and
(e) polymerizing the second monomer mixture.

The present invention is further directed to encapsulated $TiO_2$ particles comprising a first polymer layer which comprises at least 60 wt % polymerized units of acrylic monomers and a second polymer layer which comprises at least 40 wt % polymerized units of vinyl ester monomers.

DETAILED DESCRIPTION OF THE INVENTION

All percentages herein are reported in weight percent (wt %) and all temperatures are in ° C., unless otherwise specified. Processes in which temperature is not specified are performed at room temperature (20-25° C.). In the first step of the process of the present invention, an aqueous dispersion of $TiO_2$ and an sulfur-acid containing polymer, which adsorbs to the surface of the $TiO_2$ particles, are contacted with an anionic surfactant and sodium styrene sulfonate, preferably a solution of sodium styrene sulfonate. As used herein, the term "sulfur-acid containing polymer" refers to a polymeric dispersant for $TiO_2$ particles that comprises at least three sulfur acid moieties, preferably a polymer that is prepared from the polymerization of an ethylenically unsaturated sulfur-acid functional monomer. More preferably, the polymer can be prepared from copolymerization of an ethylenically unsaturated amine functional monomer and an ethylenically unsaturated sulfur-acid functional monomer. Examples of suitable ethylenically unsaturated amine functional monomers include dimethylamino ethyl(meth)acrylate, dimethylamino propyl(meth)acrylamide, and t-butylamino ethyl(meth)acrylate, with dimethylamino ethyl(meth)acrylate being preferred. Examples of suitable ethylenically unsaturated sulfur-acid functional monomers include sulfoethyl(meth)acrylate, sulfopropyl (meth)acrylate, styrene sulfonic acid, vinyl sulfonic acid, and 2-(meth)acrylamido-2-methyl propanesulfonic acid, and salts thereof, with 2-(meth)acrylamido-2-methyl propanesulfonic acid and sulfoethyl methacrylate being preferred. As used herein, the term "(meth)acrylate" refers to either acrylate or methacrylate; the term "(meth)acrylic" refers to acrylic or methacrylic; and the term "(meth)acrylamide" refers to acrylamide or methacrylamide. In addition to containing amine and sulfur acid functionality, the sulfur-acid containing polymer may additionally include functional groups arising from the compolymerization of water-soluble monomers such as hydroxyethyl(meth)acrylate, (meth)acrylamide, or (meth)acrylic acid, or combinations thereof.

The term "acrylic monomer" includes (meth)acrylic, maleic and itaconic acids and their $C_1$-$C_{22}$ alkyl and hydroxyalkyl esters and $C_7$-$C_{12}$ aralkyl esters; (meth)acrylamide and N-methyl- or N-dimethyl-substituted (meth)acrylamides; maleic anhydride and (meth)acrylonitrile. Preferably, esters are $C_1$-$C_{12}$ alkyl and hydroxyalkyl esters, preferably $C_1$-$C_{12}$ alkyl esters, preferably $C_1$-$C_4$ alkyl esters. The term "vinyl ester monomer" includes $C_1$-$C_{22}$ alkyl esters of vinyl alcohol. The term "styrene monomer" includes styrene and styrene substituted by methyl, ethyl, hydroxymethyl or chloro groups; styrene and 4-methylstyrene(vinyltoluene) are especially preferred. The term "ethylene monomer" includes $C_1$-$C_{12}$ alkenes, preferably ethylene.

Preferably, the dispersion of $TiO_2$ and the sulfur-acid containing polymer is prepared by slowly adding, with concomitant grinding, the $TiO_2$ to an aqueous solution of the sulfur-acid containing polymer. The preferred solids content of the $TiO_2$/sulfur-acid containing polymer dispersion is in the range of 70 to 80 weight percent based on the weight of $TiO_2$, sulfur-acid containing polymer, and water.

The $TiO_2$/sulfur-acid containing polymer dispersion is added to a vessel and contacted with a) an anionic surfactant such as those well known in the art, preferably mixed with water; and b) preferably a solution of sodium styrene sulfonate, more preferably as a 5 to 20 weight percent solution based on the weight of water and sodium styrene sulfonate.

In a second step, a redox initiator system is contacted with the mixture to initiate polymerization. As used herein, the term "redox initiator system" refers to a combination of a reducing agent, an oxidizing agent, and a metal ion catalyst. Examples of suitable oxidizing agents include persulfates such as ammonium and alkali metal persulfates; hydroperoxides, such as t-butyl hydroperoxide and cumene hydroperoxide; peroxides such as benzoyl peroxide, caprylyl peroxide, and di-t-butyl peroxide; peresters such as t-butyl peracetate, t-butyl perphthalate, and t-butyl perbenzoate; percarbonates; and perphosphates; with t-butyl hydroperoxide being preferred.

Examples of suitable reducing agents include ascorbic acid, isoascorbic acid, malic acid, glycolic acid, oxalic acid, lactic acid, and thioglycolic acid; an alkali metal hydrosulfite such as sodium hydrosulfite; a hyposulfite such as potassium hyposulfite; or a metabisulfite such as potassium metabisulfite; and sodium formaldehyde sulfoxylate.

Suitable accelerators include halide and sulfate salts of cobalt, iron, nickel, and copper, used in small amounts. An example of a preferred redox initiator system is t-butyl hydroperoxide/isoascorbic acid/$Fe^{+2}$. Preferably, the accelerator is added prior to the addition of the oxidizing and reducing agents. It is further preferred that the oxidizing and reducing agents are added over time to maintain a relatively even level of radical flux over the course of the addition of monomers.

A critical aspect of the process of the present invention is combining the sodium styrene sulfonate (SSS) with the $TiO_2$/sulfur-acid containing polymer dispersion before adding redox initiator system and monomer. This order of addition allows for the opportunity for advantageous adherence of polymerized sodium styrene sulfonate to the $TiO_2$ particles before onset of polymerization of the first monomers. Though not bound by theory, it is believed that this early stage adhesion is responsible for increased stability of $TiO_2$ particles, thereby resulting in a decrease in the formation of process gel. Preferably, the weight ratio of SSS to $TiO_2$ is from 0.001:1 to 0.015:1, preferably from 0.002:1 to 0.012:1, preferably from 0.002:1 to 0.011:1, preferably from 0.003:1 to 0.010:1

Preferably, the waiting period between the onset of addition of reducing agent and oxidizing agent of the redox initiator system and the first monomer mixture is in the range of from 30 seconds to about 10 minutes, more preferably from 1 minute to 5 minutes.

In the step following the addition of redox initiator, a first monomer mixture preferably is added as an aqueous dispersion with a surfactant, preferably sodium dodecylbenzene sulfonate or dodecyl allyl sulfosuccinate.

The polymers which form the binder typically have glass transition temperatures in the range of from −60° C. to 150° C., as calculated by the Fox equation (See *Bulletin of the American Physical Society* 1, 3 Page 123 (1956)). The coating or plastic composition optionally contains coalescents or plasticizers to provide the polymers with effective film formation temperature at or below the temperature at which the coating is applied or cured, or the plastic part is formed. The level of optional coalescent is typically in the range of from 0 to 40 wt %, based on the weight of the polymer solids.

For coatings applications, it is desirable to prepare encapsulating polymers that are film-forming at ambient temperatures. This can be achieved by using a polymer with a $T_g$ above ambient temperature where coalescents are included, or the nature and relative concentrations of monomers are selected to yield first polymers having a $T_g$ of preferably not more than 20° C., more preferably not more than 10° C., and most preferably not more than 0° C.; and preferably not less not less than −40° C., and more preferably not less than −30° C., as determined by Fox equation. (See *Bulletin of the American Physical Society* 1, 3 Page 123 (1956)). One of ordinary skill in the art would be able to prepare polymers at a desired $T_g$.

Preferably, the first monomer mixture comprises at least 90 wt % of monomers selected from the group consisting of acrylic monomers, ethylene monomers, styrene monomers, vinyl ester monomers, and combinations thereof (preferably acrylic monomers, styrene monomers, vinyl ester monomers and combinations thereof; preferably acrylic monomers, styrene monomers and combinations thereof); preferably at least 95 wt %, preferably at least 98 wt %, preferably at least 99 wt %. Preferably, the first monomer mixture comprises at least 70 wt % acrylic monomers, preferably at least 80 wt %, preferably at least 85 wt %, preferably at least 90 wt %, preferably at least 95 wt %. Preferably, the first monomer mixture comprises at least 80 wt % acrylic monomers and styrene monomers, preferably at least 85 wt %, preferably at least 90 wt %, preferably at least 95 wt %, preferably at least 98 wt %; preferably "styrene monomers" are limited to styrene. Preferred (meth)acrylate monomers include methyl (meth)acrylate, ethyl(meth)acrylate, and butyl(meth)acrylate and combinations thereof. For coatings applications, preferred (meth)acrylate monomers are combinations of butyl acrylate/methyl methacrylate; ethyl hexyl acrylate/methyl methacrylate; and butyl acrylate/ethyl hexyl acrylate/methyl methacrylate. Preferably, the first monomer mixture comprises from 40 to 75 wt % of a $C_2$-$C_8$ alkyl(meth)acrylate, preferably a $C_4$-$C_8$ alkyl(meth)acrylate, preferably a $C_2$-$C_8$ alkyl acrylate. Preferably, the first monomer mixture comprises at least 45 wt % of a $C_2$-$C_8$ alkyl(meth)acrylate, preferably at least 50 wt %, preferably at least 55 wt %; preferably no more than 70 wt %, preferably no more than 65 wt %, preferably no more than 62 wt %. Preferably, the first monomer mixture comprises from 25 to 55 wt % of methyl methacrylate. Preferably, the first monomer mixture comprises at least 45 wt % of methyl methacrylate, preferably at least 50 wt %, preferably at least 55 wt %; preferably no more than 70 wt %, preferably no more than 65 wt %, preferably no more than 62 wt %. Preferably, the first monomer mixture comprises from 0.1 to 5 wt % of (meth)acrylic acids, preferably at least 0.5 wt %, preferably at least 0.7 wt %; preferably no more than 4 wt %, preferably no more than 3 wt %, preferably no more than 2 wt %, preferably no more than 1.5 wt %. Percentages of monomers stated herein are based on the total weight of monomers in the first monomer mixture.

In a preferred embodiment, the first monomer mixture comprises styrene and an acrylate monomer such as butyl acrylate, ethyl acrylate, and 2-ethyl hexyl acrylate or combinations thereof. In this embodiment, styrene is used in amounts corresponding to those given above for methyl methacrylate. Mixtures of styrene and methyl methacrylate may be used.

Preferably, the first monomer mixture includes a crosslinking monomer, which, at low levels, has been found to improve the hiding efficiency of the encapsulated particles. The crosslinking monomer is preferably a multiethylenically unsaturated crosslinking monomer, preferably a diethylenically unsaturated monomer, preferably having a molecular weight from 100 to 250, preferably from 120 to 200. Preferably, the crosslinker is used at a level sufficient to form a polymer that is resistant to deformation, preferably in the range of from 0.05 to 3 wt %, preferably from 0.1 to 2 wt %, preferably from 0.2 to 1 wt %, preferably from 0.3 to 0.7 wt %; all weights based on the total weight of monomers in the first monomer mixture. A preferred crosslinking monomer is allyl methacrylate used at a concentration of from 0.1 to 2 weight percent, based on the weight of total first monomers.

In a next step, the first monomers are polymerized under polymerization conditions, preferably, at a starting temperature in the range of from 20° C. to 75° C. to form a first stage polymer having the desired $T_g$. Useful polymers can be prepared without an additional external heating source.

Subsequent to the first stage polymerization, a second stage polymerization step is performed by adding second monomers to the vessel, followed by polymerization to form a second stage polymer, which, for coatings applications, preferably has a $T_g$ of less than 20° C., preferably less than 10° C., and more preferably less than 0° C. and preferably not less not less than −40° C., and more preferably not less than −30° C. Preferably, the second monomer mixture contains no crosslinking monomer.

Preferably, the second monomer mixture comprises at least 90 wt % of monomers selected from the group consisting of acrylic monomers, ethylene monomers, styrene monomers, vinyl ester monomers, and combinations thereof (preferably acrylic monomers, styrene monomers, vinyl ester monomers and combinations thereof; preferably acrylic monomers, vinyl ester monomers and combinations thereof); preferably at least 95 wt %, preferably at least 98 wt %, preferably at least 99 wt %. Preferably, the second monomer mixture comprises at least 55 wt % vinyl ester monomers, preferably at least 60 wt %, preferably at least 62 wt %, preferably at least 64 wt %; preferably no more than 90 wt %, preferably no more than 80 wt %, preferably no more than 75 wt %, preferably no more than 70 wt %. Preferably, the vinyl ester monomer is a $C_1$-$C_{12}$ alkyl ester of vinyl alcohol, preferably a $C_1$-$C_6$ alkyl ester of vinyl alcohol, preferably vinyl acetate. Preferably, the second monomer mixture comprises at least 25 wt % alkyl(meth)acrylate monomers, preferably at least 30 wt %, preferably at least 32 wt %; preferably no more than 50 wt %, preferably no more than 45 wt %, preferably no more than 40 wt %, preferably no more than 36 wt %. Preferably, the alkyl(meth)acrylate monomers are $C_2$-$C_8$ alkyl acrylates. Preferably the second monomer mixture comprises from 0.1 to1 wt % 2-acrylamido-2-methylpropane-sulfonic acid (AMPS), preferably from 0.2 to 0.8 wt %, preferably from 0.3 to 0.7 wt %. Percentages of monomers stated herein are based on the total weight of monomers in the second monomer mixture.

The preferred weight ratio of encapsulating polymer from both polymerization stages to weight of $TiO_2$ particles depends on the amount of hiding improvement desired. This is completely adjustable and less encapsulating polymer leads to greater formulation versatility, while higher encapsulating polymer ratios leads to greater hiding, but less paint formulation versatility. The improvements in hiding with use of crosslinking monomer in the first stage encapsulating polymer are consistent across various weight ratios of total encapsulating polymer to $TiO_2$. Preferably, the weight ratio of encapsulating polymer from both polymerization stages to weight of $TiO_2$ particles is from 0.5:1 to 2.0:1, preferably from 0.6:1 to 1.6:1. Preferably, the weight ratio of the first polymer stage to $TiO_2$ is from 0.05:1 to 0.8:1, preferably from 0.1:1 to 0.6:1, preferably from 0.15:1 to 0.5:1. Preferably, the weight ratio of the second polymer stage to $TiO_2$ is from 0.3:1 to 1.2:1, preferably from 0.4:1 to 1:1, preferably from 0.5:1 to 1:1. These weight ratios are the same as weight ratios of the monomers in the first and second monomer mixtures to $TiO_2$.

Subsequent to the second polymerization step, preferably the mixture is neutralized with a suitable base. The resultant formulation is a dispersion of $TiO_2$ particles at least partially encapsulated with sodium styrene sulfonate polymer and any or all of the (meth)acrylate, styrene, vinyl ester, (meth)acrylate-styrene, (meth)acrylate-vinyl ester, and ethylene-vinyl ester based polymers. As used herein, the term "at least partially encapsulated" means that at least part of the surface of $TiO_2$ is in contact with the polymer or polymers as determined by scanning electron microscopy. It is preferred that the $TiO_2$ particles be completely encapsulated by polymer.

Preferably, the second stage polymer at least partially encapsulates the first polymer-encapsulated $TiO_2$ particles. In a more preferred embodiment, the first stage polymer totally encapsulates the $TiO_2$ particles and the second stage polymer totally encapsulates the first stage polymer. The process of the present invention prepares polymer encapsulated $TiO_2$ particles in a manner that has been found to increase spacing of the particles, thereby improving hiding efficiency.

The advantage of $TiO_2$ particles encapsulated with one or more polymers having $T_g$ of not greater than 20° C. is that the use of such ambient temperature film forming particles gives lower pigment volume content (PVC) than particles containing a high $T_g$ (not less than 40° C.) polymer phase. Consequently, formulators would have more latitude in their ability to decrease the level of high $T_g$ and high cost binder in favor of higher concentrations of low-cost extender.

Although low $T_g$ first and second polymers are desirable for coatings applications, it may be desirable to prepare high $T_g$ polymers for plastics applications. Thus, in another embodiment of the present invention, the nature and concentration of monomers is designed to produce a relatively high $T_g$ first and/or second polymer phase, preferably a low $T_g$ first polymer phase ($T_g$=−30° C. to 20° C.) and high $T_g$ second polymer phase ($T_g$=40° C. to 120° C.).

In another preferred embodiment, the present invention is a composition comprising an aqueous dispersion of a polymer encapsulating $TiO_2$ particles wherein the encapsulating polymer has a $T_g$ of not greater than 20° C. and comprises a first polymer layer which comprises at least 60 wt % polymerized units of acrylic monomers and a second polymer layer which comprises at least 40 wt % polymerized units of vinyl ester monomers, and wherein the encapsulating polymer further contains polymerized units of sodium styrene sulfonate. As used herein, the term "polymerized units of sodium styrene sulfonate" refers to the following groups:

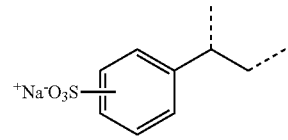

where the dotted lines represent the points of attachment to the polymer backbone.

EXAMPLES

| Abbreviations |
|---|
| SDS = Sodium dodecylbenzene sulfonate (23%) |
| SSS = Sodium styrene sulfonate |
| t-BHP = t-Butyl hydroperoxide |
| EDTA = Ethylene diamine tetraacetic acid |
| IAA = Isoascorbic acid |
| AMPS = 2-acrylamido-2-methylpropane-sulfonic acid |
| PVC = pigment volume concentration |
| VA = vinyl acetate |
| BA = Butyl acrylate |
| MMA = Methyl methacrylate |
| MAA = Glacial methacrylic acid |
| ALMA = Allyl methacrylate |
| DI water = Deionized water |

Example 1

Encapsulation of $TiO_2$ with Vinyl-Acrylic Polymer (Comparative)

Before polymerization occurs, a titanium dioxide particle slurry is generated. The slurry is prepared with $TiO_2$ and an sulfur-acid containing dispersant on a Cowles high speed disperser. The slurry is then transferred to a reactor, along with an initial charge of surfactant (sodium dodecylbenzene sulfonate), and heated to 30° C. under agitation. Sodium styrene sulfonate and an iron catalyst are then added. The polymerization is initiated with a short pre-feed of the t-butyl hydroperoxide (t-BHP)/isoascorbic acid (IAA) redox pair. Subsequently the monomer emulsion feed and redox initiator co-feeds are added to the reactor. The reaction slowly exotherms to 68° C. during the feeds. The co-feed is extended beyond the completion of the monomer emulsion and then a second portion of the redox pair is fed to chase down residual monomer levels.

Examples 2-5

Encapsulation of TiO$_2$ with an Acrylic First Stage and Vinyl-Acrylic Second Stage Before polymerization occurs, a titanium dioxide particle slurry is generated. The slurry is prepared with TiO$_2$ and an sulfur-acid containing dispersant on a Cowles high speed disperser. The slurry is then transferred to a reactor, along with an initial charge of surfactant (sodium dodecylbenzene sulfonate), and heated to 30° C. under agitation. A monomer (sodium styrene sulfonate, SSS), and an iron catalyst are then added. The polymerization is initiated with a short pre-feed of the t-butyl hydroperoxide (t-BHP)/isoascorbic acid (IAA) redox pair. Subsequently the first stage monomer emulsion feed and redox initiator co-feeds are added to the reactor. The reaction slowly exotherms to 68° C. during the feeds. After a brief pause between stages, the second stage monomer emulsion is then fed to the reactor, again with a redox co-feed. This co-feed is extended beyond the completion of the second stage monomer emulsion and then a different redox pair is fed to chase down residual monomer levels.

Examples 1-5 were used to prepare coatings based on the following formulation at 16 PVC.

Examples 6-11 (additional polymers that show the improvement in hiding with 1$^{st}$ stage crosslinking continues at higher polymer/TiO$_2$ weight ratios.

Paint formulation used for evaluation of the hiding the polymer encapsulated titanium dioxide.

| Material | Weight (g) |
| --- | --- |
| Examples 1-5 | 55.46 |
| ROVACE ™ 9900 binder | 21.81 |
| RHODOLINE 643 defoamer | 0.13 |
| Ammonia (28%) | 0.36 |
| Water | 2.29 |
| NATROSOL 250 MHR (3%) thickener | 19.95 |
| Total | 100.00 |

Measurement of Hiding (Opacity) of Coatings

Two thin films were drawn down over two black release charts (Leneta # RC-BC) using a 1.5 mil (0.0381 mm) Bird bar (BYK-Gardner; Columbia, Md.). A thick film was drawn down over a black vinyl scrub chart (Lenta # P121010N) using a bar with a 25 mil (0.635 mm) gap. The films were dried over night at ambient temperature and relative humidity. Two 8.3 cm by 10.2 cm rectangular areas were inscribed into each thin film using a razor blade. The Y-reflectance of the dry films were measured by a reflectometer, Microlight (BYK-Gardner; Columbia, Md.); for the thin films the average Y-reflectance was determined for each of the four inscribed rectangular areas, which were then peeled off of the charts and weighed to 0.0001 g. The Kubelka-Munk scattering coefficient S/mm was then calculated for each inscribed rectangular area by the equation:

$$S = \frac{1}{X}\left(\frac{Y_\infty}{(1-Y_\infty^2)}\right) \ln\left[\frac{1-YY_\infty}{1-\frac{Y}{Y_\infty}}\right]$$

where X is the thickness of the dry film in mm, $Y_\infty$ is the Y-reflectance of the thick film, Y is the average Y-reflectance of the inscribed rectangular area of the thin film, and $$X = \frac{W}{\rho}0.1193$$

where W is the weight of the inscribed rectangular area in g and p is the dry density of the film in g/cm$^3$. The average S/mm for a coating is the average of the S/mm values measured for the four inscribed rectangular areas. The average S/mm is considered accurate (one standard deviation) to +/−1.5%.

In Examples 1-6, the weight ratio of encapsulating polymer to TiO$_2$ is 0.8:1. In the samples made according to this invention, having a two-stage encapsulation (Exs. 2-5), the first stage is at a ratio of 0.2:1 and the second stage at 0.6:1. The SSS is separated from the first stage, and the first stage from the second, by the symbol "//". The hiding results for the samples described above are tabulated below along with their compositions.

| Ex. No. | Composition | S/mm |
| --- | --- | --- |
| 1 | 1 TiO$_2$, 0.004 SSS// 65 VA/34 MMA/1.0 AMPS | 303 |
| 2 | 1 TiO$_2$, 0.008 SSS// 59 BA/39.5 MMA/0.5 ALMA/1.0 MAA//65.5 VA/34 BA/0.5 AMPS | 334 |
| 3 | 1 TiO$_2$, 0.004 SSS// 59 BA/39.5 MMA/0.5 ALMA/1.0 MAA//65.5 VA/34 BA/0.5 AMPS | 332 |
| 4 | 1 TiO$_2$, 0.008 SSS// 59 BA/40 MMA/1.0 MAA//65.5 VA/34 BA/0.5 AMPS | 322 |
| 5 | 1 TiO$_2$, 0.004 SSS// 59 BA/40 MMA/1.0 MAA//65.5 VA/34 BA/0.5 AMPS | 320 |
| 6 | 1 TiO$_2$, 0.8 polymer; 0.004 SSS// 65.5 VA/34.0 BA/0.5 AMPS (comparative) | |
| 7 | 1 TiO$_2$, 0.8 polymer; 0.004 SSS// 0.2(59 BA/39.5 MMA/0.5 ALMA/1 MAA)//0.6(65.5 VA/34 BA/0.5 AMPS) | |
| 8 | 1 TiO$_2$, 1.2 polymer; 0.004 SSS// 65.5 VA/34.0 BA/0.5 AMPS (comparative) | |
| 9 | 1 TiO$_2$, 1.2 polymer; 0.004 SSS// 0.2(59 BA/39.5 MMA/0.5 ALMA/1 MAA)//1.0(65.5 VA/34 BA/0.5 AMPS) | |
| 10 | 1 TiO$_2$, 1.6 polymer; 0.004 SSS// 65.5 VA/34.0 BA/0.5 AMPS (comparative) | |
| 11 | 1 TiO$_2$, 1.6 polymer; 0.004 SSS// 0.2(59 BA/39.5 MMA/0.5 ALMA/1 MAA)//1.4(65.5 VA/34 BA/0.5 AMPS) | |

Example Paints 12-24 were made based on the polymer encapsulated TiO$_2$ examples 6-11. A model formulation is shown below for example paints 12-15. All paints had the total PVC kept constant, and when TiO$_2$ volume was increased, the ultrafine clay (POLYGLOSS 90) was decreased commensurately.

| Materials | Ex 12 | Ex 13 | Ex 14 | Ex 15 | PVC |
|---|---|---|---|---|---|
| TI-PURE R-746 (titanium dioxide) | 7.22 | | | | 5.4 |
| Example 6 | | 17.21 | | | 5.4 |
| Example 8 | | | 21.08 | | 5.4 |
| Example 10 | | | | 24.99 | 5.4 |
| Grind | | | | | |
| MINEX 10 (nephyline synenite) | 12.35 | 12.35 | 12.35 | 12.35 | 18.50 |
| MINEX 4 (nephyline synenite) | 12.35 | 12.35 | 12.35 | 12.35 | 18.50 |
| Polygloss 90 (clay) | 5.32 | 5.32 | 5.32 | 5.32 | 8.00 |
| TAMOL 1254 (dispersant) | 0.45 | 0.45 | 0.45 | 0.45 | |
| BYK-348 (surfactant) | 0.18 | 0.18 | 0.18 | 0.18 | |
| FOAMSTAR A-34 (defoamer) | 0.05 | 0.05 | 0.05 | 0.05 | |
| Water | 10.81 | 10.81 | 10.81 | 10.81 | |
| Letdown | | | | | |
| Propylene Glycol | 1.35 | 1.35 | 1.35 | 1.35 | |
| TEXANOL (COALESCENT) | 0.44 | 0.44 | 0.44 | 0.44 | |
| ROVACE 9900 (binder) | 26.57 | 17.99 | 13.84 | 9.70 | |
| TRITON X-100 (surfactant) | 0.45 | 0.45 | 0.45 | 0.45 | |
| FOAMSTAR A-34 (defoamer) | 0.09 | 0.09 | 0.09 | 0.09 | |
| Ammonia (28%) | 0.08 | 0.08 | 0.08 | 0.08 | |
| NATROSOL 250 MHR (3%) (thickener) | 15.77 | 15.77 | 15.77 | 15.77 | |
| Water | 6.51 | 5.13 | 5.41 | 5.63 | |
| Total | 100.00 | 100.00 | 100.00 | 100.00 | 50.40 |

To show that the improvement in hiding is seen across a range of weight ratios of polymer to TiO$_2$, we formulated examples 6-11 (resulting in paint examples 12-25) according to the composition above at different TiO$_2$ levels, but with a constant total PVC of 50.4. The increase in hiding for a crosslinked 1$^{st}$ stage becomes greater at higher TiO$_2$ levels.

| Ex. | Encapsulated Polymer level | TiO2 PVC | Polygloss 90 | S/mm control | S/mm not crosslinked | S/mm with crosslinker |
|---|---|---|---|---|---|---|
| 12 | 0 | 5.4% | 8.0% | 106 | | |
| 13a | 0.8 | 5.4% | 8.0% | | 108 | |
| 13b | 0.8 | 5.4% | 8.0% | | | 108 |
| 14a | 1.2 | 5.4% | 8.0% | | 110 | |
| 14b | 1.2 | 5.4% | 8.0% | | | 111 |
| 15a | 1.6 | 5.4% | 8.0% | | 110 | |
| 15b | 1.6 | 5.4% | 8.0% | | | 111 |
| 16a | 0.8 | 7.4% | 6.0% | | 137 | |
| 16b | 0.8 | 7.4% | 6.0% | | | 141 |
| 17a | 1.2 | 7.4% | 6.0% | | 140 | |
| 17b | 1.2 | 7.4% | 6.0% | | | 142 |
| 18a | 1.6 | 7.4% | 6.0% | | 141 | |
| 18b | 1.6 | 7.4% | 6.0% | | | 145 |
| 19 | 0 | 9.4% | 4.0% | 152 | | |
| 20a | 0.8 | 9.4% | 4.0% | | 162 | |
| 20b | 0.8 | 9.4% | 4.0% | | | 169 |
| 21a | 1.2 | 9.4% | 4.0% | | 167 | |
| 21b | 1.2 | 9.4% | 4.0% | | | 175 |
| 22 | 0 | 11.4% | 2.0% | 172 | | |
| 23a | 0.8 | 11.4% | 2.0% | | 187 | |
| 23b | 0.8 | 11.4% | 2.0% | | | 193 |
| 24a | 1.2 | 11.4% | 2.0% | | 191 | |
| 24b | 1.2 | 11.4% | 2.0% | | | 202 |

The invention claimed is:

1. A process comprising steps of:
   (a) contacting a mixture of i) an aqueous dispersion of TiO$_2$ particles and a sulfur-acid containing polymer; ii) an anionic surfactant; and iii) an aqueous solution of sodium styrene sulfonate with a redox initiator system; then
   (b) adding to the mixture of step (a) an aqueous dispersion of a first monomer mixture comprising monomers selected from the group consisting of acrylic monomers, ethylene monomers, styrene monomers, vinyl ester monomers, and combinations thereof; wherein said first monomer mixture comprises at least 60 wt % acrylic monomers, based on total weight of monomers in the first monomer mixture;
   (c) polymerizing the first monomer mixture to form an aqueous dispersion of a first polymer that at least partially encapsulates the TiO$_2$ particles;
   (d) adding to the aqueous dispersion of step (c) an aqueous dispersion of a second monomer mixture comprising monomers selected from the group consisting of acrylic monomers, ethylene monomers, styrene monomers, vinyl ester monomers, and combinations thereof; wherein said second monomer mixture comprises at least 50 wt % vinyl ester monomers, based on total weight of monomers in the second monomer mixture; and
   (e) polymerizing the second monomer mixture; wherein a ratio of the total weight of monomers in the first monomer mixture to weight of TiO$_2$ particles is from 0.1:1 to 0.6:1 and a ratio of the total weight of monomers in the second monomer mixture to weight of TiO$_2$ particles is from 0.4:1 to 1.4:1.

2. The process of claim 1 wherein a ratio of weight of sodium styrene sulfonate to weight of TiO$_2$ particles is from 0.001:1 to 0.015:1.

3. The process of claim 2 wherein said first monomer mixture comprises at least 85 wt % acrylic monomers and styrene monomers, based on total weight of monomers in the first monomer mixture.

4. The process of claim 3 wherein said second monomer mixture comprises at least 55 wt % vinyl ester monomers, based on total weight of monomers in the second monomer mixture.

5. The process of claim 4 wherein the first monomer mixture comprises from 0.1 to 2 wt % of a crosslinking monomer.

6. The process of claim 5 wherein the second monomer mixture comprises from 50 to 100 wt % of vinyl acetate, based on total weight of monomers in the second monomer mixture.

* * * * *